Figure 3:
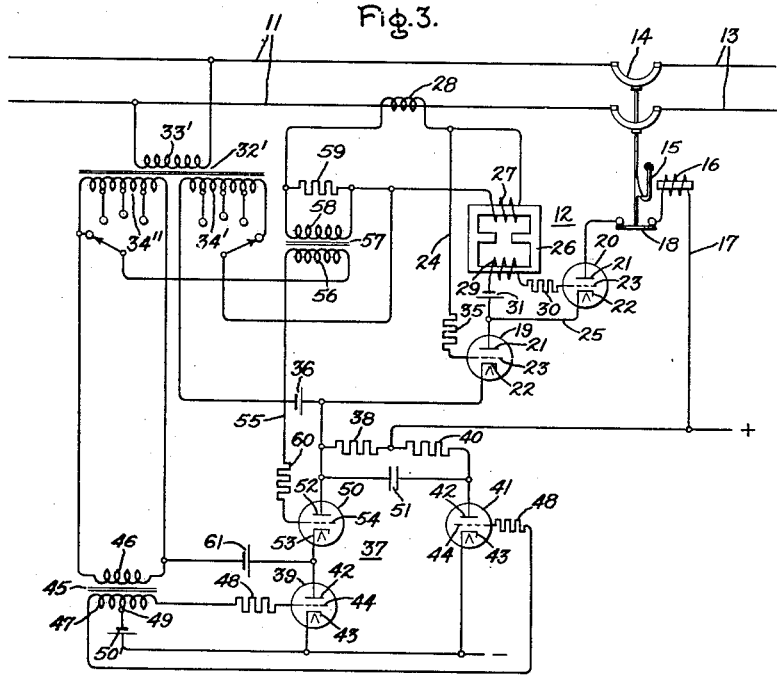

Oct. 20, 1942.                M. E. BIVENS                 2,299,561
                            PROTECTIVE APPARATUS
                            Filed Sept. 6, 1940            2 Sheets-Sheet 1
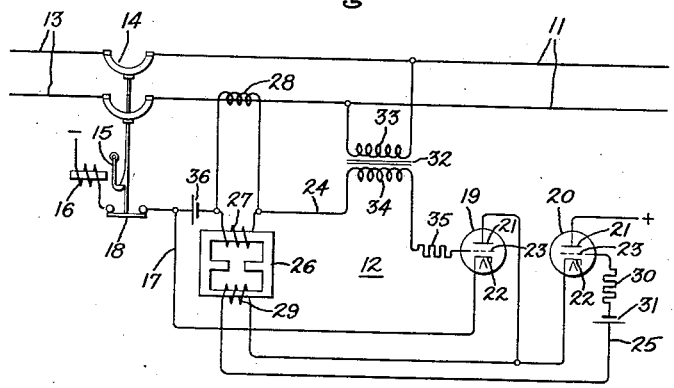
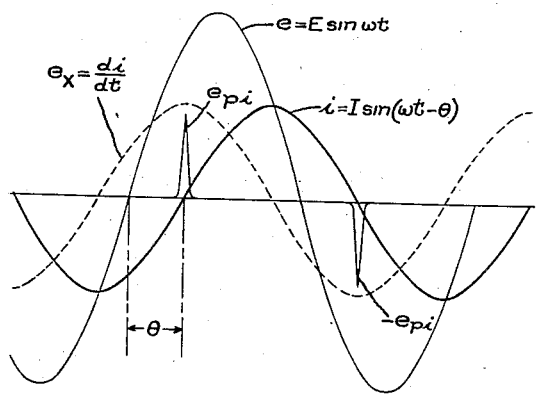
Inventor:
Maurice E. Bivens,
by Harry E. Dunham
His Attorney.

Inventor:
Maurice E. Bivens,
by Harry E. Dunham
His Attorney.

Patented Oct. 20, 1942

2,299,561

UNITED STATES PATENT OFFICE 2,299,561

PROTECTIVE APPARATUS

Maurice E. Bivens, Schenectady, N. Y., assignor to General Electric Company, a corporation of New York Application September 6, 1940, Serial No. 355,579

26 Claims. (Cl. 175—294)

My invention relates to protective apparatus and more particularly to fault-responsive protective apparatus whose operation is dependent upon a function of the current and a function of the voltage of the system being protected.

One object of my invention is to provide a new and improved protective system embodying an electronic relay which is truly instantaneous in operation in the sense of operating in substantially zero time, which eliminates any difficulty arising from inertia, friction, wear, or incorrect adjustment, and which is very sensitive in its operation.

Another object of my invention is to provide a new and improved protective system for an alternating-current circuit including electronic means which responds to a predetermined function of the instantaneous values of certain electrical quantities derived from said alternating-current circuit at an instant when a predetermined relation between the derived instantaneous values corresponds to a predetermined function of certain electrical quantities of said circuit and the phase angle between them.

Another object of my invention is to provide a new and improved protective arrangement embodying an electronic reactance type of distance relay in which a voltage proportional to the system voltage is compared with a voltage proportional to a rate of change of system current substantially at the instant the system current is zero.

A further object of my invention is to provide a protective system including an electronic relay in which a peaking transformer is used to time the instant during each cycle at which the measurement or comparison of certain electrical quantities is made.

Still another object of my invention is to provide a new and improved relay which measures or compares certain instantaneous values of alternating electrical quantities or functions thereof at a predetermined instant during the cycle when these instantaneous values or functions thereof correspond to a predetermined relationship between the amplitudes of and phase angle between these alternating electrical quantities.

Further objects and advantages of my invention will become apparent as the following description proceeds and the features of novelty which characterize my invention will be pointed out with particularity in the claims annexed to and forming a part of this specification.

Distance relays are one example of fault-responsive protective apparatus, whose operation is dependent upon a function of the current and a function of the voltage of the system, and they consist of two general types—impedance relays and reactance relays. The former compares the magnitude of the voltage with that of the current, the ratio being the indicated impedance. When a fault occurs in a particular line section protected by an impedance relay, the impedance of that circuit is reduced to a point that will cause the relay to operate. Because of a considerable amount of arc resistance at the point of a fault, an impedance relay may operate improperly in that this arc resistance increases the circuit impedance beyond the value for a dead short circuit and, therefore, makes the fault appear more distant than it really is. To eliminate this difficulty, distance relays have been designed which depend upon reactance only for their operation and, since the voltage drop across the arc is practically entirely of a resistance character, substantially no error in distance measurement because of the arc drop is introduced in a reactance relay. Although certain phases of my invention are applicable to various types of relays including either impedance or reactance relays, my invention is more specifically concerned with distance relays of the reactance type.

Distance relays depending upon reactance for their operation generally include a reactance-measuring element, which is usually referred to as an ohm unit, and a directional starting unit. A directional starting unit which is a form of a reverse power relay or power directional relay permits operation of the distance relay with respect to faults in only one direction therefrom. The function of the ohm unit of the reactance relay on the other hand is to determine whether the reactive component of impedance of the circuit is greater or less than a predetermined value. The ohm units of reactance relays known heretofore generally were of the mechanical type and comprised a movable system upon which a plurality of torques were exerted by virtue of the energization of a plurality of windings associated therewith. Usually an operating torque proportional to the square of the current, $I^2$, and a restraining torque proportional to $EI \sin \theta$, where $E$ and $I$ are the peak values of voltage and current and $\theta$ is the power factor angle, were applied to the movable system. When the two torques were equal then $$I^2 = EI \sin \theta \tag{1}$$

or $$X = \frac{E \sin \theta}{I} \tag{2}$$

where X is the critical value of the reactance below which operation of the ohm unit resulted. If the reactance decreased below this minimum value, thereby indicating that a fault existed on the protected section of the system, the operating torque caused operation of the ohm unit to initiate the means for isolating the faulted section of the system.

Such mechanical ohm units known heretofore have certain inherent characteristics, for example, inertia, friction, and the like, which render them incapable of instantaneous operation in the sense of operating in substantially zero time. It would be desirable to increase the speed of operation of ohm units and, since electronic relays are known to be truly instantaneous in their operation, an electronic ohm unit suggests itself. However, when alternating electrical quantities are applied to electronic devices, their action is dependent only upon the instantaneous values of the electrical quantities applied and there is no delay in which an averaging or summation effect could occur whereby the electrical quantities could be vectorially added or subtracted within the electric discharge valves of the electronic device. In this respect, the mechanical ohm units known heretofore have an advantage in that they tend to operate in response to the average or effective values of the torques produced by the instantaneous alternating electrical quantities applied thereto and, hence, will respond to a function of the amplitudes and phase relationship between these electrical quantities so that the reactance as expressed by Equation 2 above can readily be determined therewith. Furthermore, the plurality of torques produced may be added or subtracted by their action on a common mechanical element, such as a shaft.

Since instantaneously operating electronic devices do not readily lend themselves to the measurement of the sine or cosine of the power factor angle as would seem to be required of an ohm unit in view of Equation 2 above, it is necessary, in order to utilize the capabilities and advantages of electric discharge valves in the ohm units of reactance relays so as to retain the merits of instantaneous operation, no moving parts, and, consequently, no inertia or friction to result in wear or incorrect adjustment, to provide an electronic ohm unit for a reactance relay which responds to the instantaneous values of alternating electrical quantities at a time when they correspond to the desired function of amplitudes of and phase relationship between these electrical quantities.

The following mathematical analysis is included in order to show that the measurement or comparison of instantaneous electrical quantities at a particular instant during the cycle will satisfy Equation 2 above, which includes no instantaneous values of alternating electrical quantities but rather a function of the peak values and phase relationship of these quantities. It is fundamental, of course, that the instantaneous voltage of a circuit containing resistance and inductance may be expressed by the well-known equation $$e = iR + L\frac{di}{dt} \quad (3)$$

where R is the resistance of the circuit, L the inductance of the circuit, $di/dt$ the rate of change of current through the inductance of the circuit, and $e$ and $i$ are respectively the instantaneous values of alternating voltage and current of the circuit. Where the alternating current and voltage quantities of the circuit are sinusoidal in form, the instantaneous voltage and current may be represented by the following equations:

$$e = E \sin \omega t \quad (4)$$
$$i = I \sin (\omega t - \theta) \quad (5)$$

where $\omega$ is the angular frequency of the alternating-current circuit in radians per second.

In an alternating-current circuit at the instant the current passes through zero, Equations 3, 4, and 5 may be considerably simplified since, at this instant, $\omega t = \theta$. Thus, Equations 3, 4, and 5, at the instant the circuit current is zero, may be expressed as follows:

$$e = L\frac{di}{dt} \quad (3a)$$

$$e = E \sin \theta \quad (4a)$$

$$i = 0 \quad (5a)$$

Also, at this instant $$\frac{di}{dt} = I\omega \quad (6)$$

Therefore, at the instant the current of the circuit is zero, the inductance L of the circuit may be expressed as follows:

$$L = \frac{e}{\frac{di}{dt}} \quad (7)$$

or the reactance of the circuit X may be expressed by the following equation:

$$X = \omega \frac{e}{\frac{di}{dt}} \quad (8)$$

If the instantaneous values of $e$ and $di/dt$ at current zero expressed by Equations 4a and 6 are substituted in Equation 8, the value of reactance is expressed by the following equation:

$$X = \frac{E \sin \theta}{I} \quad (2)$$

which is Equation 2 expressed above. It is obvious, therefore, that, at a predetermined instant during the cycle, namely current zero, the instantaneous electrical quantities expressed by Equation 8, the ratio of which is proportional to the reactance of the circuit, correspond to the function of amplitudes and phase relationship of the quantities as set forth in Equation 2.

My invention is also concerned with a directional relay or an electronic starting unit which may be used in a reactance type distance relay, and the same problem arises in connection therewith as was discussed with respect to the ohm unit above. Directional relays or starting units of the prior art of mechanical form usually operate in response to a resultant torque which is proportional to $$\frac{E}{I \cos \theta}$$

which relationship is obtained by providing means for exerting on the movable system of the mechanical directional relay or starting unit a voltage-restraining torque proportional to $E^2$ and an operating torque proportional to $EI \cos \theta$, the cosine function being used in order to obtain the desired directional characteristic. The function $$\frac{E}{I \cos \theta}$$

may be utilized in connection with an electronic directional relay which responds to instantaneous values only if a predetermined instant during the cycle is chosen where a predetermined function of these instantaneous values corresponds to the function of peak values and phase angle set forth above. This condition may be satisfied in an alternating-current circuit at the instant the instantaneous voltage is maximum, that is, when $e=E$, for then the instantaneous current value $i=I\cos\theta$. The principle of operation of my invention, therefore, is based upon the fact that the instantaneous electrical quantities of a circuit to which electronic devices respond at predetermined times during a cycle may be represented by a function of peak value and phase angle between the quantities.

In applying this principle to an electronic reactance relay, it is obvious that means must be provided whereby the preselected instant during the cycle can affect the electronic devices to register that that instant is the correct time and the only correct time at which to perform a measurement of comparison of the electrical quantities involved. My invention is specifically concerned with a means for obtaining this preselected instant and the application of such means to electronic relays, such as an ohm unit and a directional relay, both of which may be used in electronic distance relays, and is an improvement on United States Patents 1,967,849 and 1,967,850, granted July 24, 1934, upon an application of Rolf Wideröe, and assigned to the same assignee as the present application.

Figure 4:
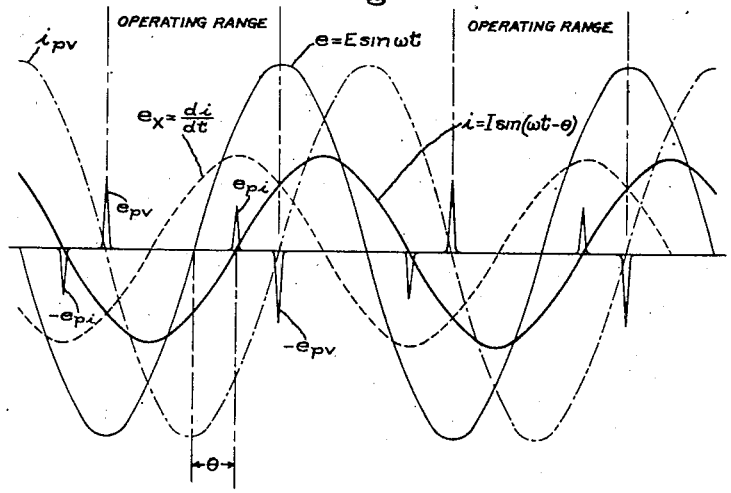

For a better understanding of my invention, reference may be had to the accompanying drawings in which Fig. 1 is a schematic diagram illustrating a protective system employing an electronic relay embodying my invention; Fig. 2 represents certain wave forms to aid in the understanding of the operation of the arrangement disclosed in Fig. 1; Fig. 3 is a schematic diagram of a protective system comprising an electronic reactance relay embodying my invention, and Fig. 4 represents certain wave forms to aid in understanding the operation of the arrangement disclosed in Fig. 3.

Referring now to Fig. 1, I have illustrated an alternating-current system 11 which is protected against faults by means of an electronic reactance-responsive device, generally indicated at 12 which makes a comparison between two electrical quantities, the ratio of which is a function of the reactance of the circuit. If, at any time, a fault should occur on the protected system within the range reached by the reactance-responsive device 12, the reactance would be decreased sufficiently so that, when a comparison is made between the electrical quantities involved, a tripping current will flow to cause isolation of this particular section of the system upon which the fault exists. While I have illustrated single-phase circuits in order to simplify the disclosure, it will be evident to those skilled in the art that my invention is also applicable to polyphase alternating-current circuits.

The alternating-current system 11 is illustrated in Fig. 1 as being connected to a similar alternating-current system 13 through a device to be operated such as circuit breaker 14 of the latched closed type which is provided with a latch 15 for maintaining the associated circuit breaker in its closed position and a trip coil 16 which, when energized, releases the associated latch 15 to permit circuit breaker 14 to open. Trip coil 16 is arranged to be connected in a tripping circuit 17 in series with a so-called "a" switch 18, which is closed when the circuit breaker is closed and open when the circuit breaker is open, thereby preventing energization of trip coil 16 unless circuit breaker 14 is closed.

The electronic reactance-responsive device or ohm unit 12 is provided to cause opening of circuit breaker 14 and isolation of alternating-current system 11 whenever a fault occurs thereon within the distance for which ohm unit 12 is designed to reach as is determined by the predetermined reactance setting thereof. Ohm unit 12 is illustrated as comprising a pair of electric discharge valves 19 and 20 which are serially connected in the tripping circuit 17. A direct-current potential is applied across this tripping circuit so as to cause tripping current to flow therein when electric discharge valves 19 and 20 are both conductive simultaneously. Each of the electric discharge valves 19 and 20 is illustrated as provided with an anode 21, a cathode 22, and a control electrode or grid 23. Although electric discharge valves 19 and 20 may be any of the several types well known in the art, I prefer to use valves of the vapor electric discharge type.

Electric discharge valve 19 is provided with a control circuit 24 to be described hereinafter, which is energized with instantaneous electrical quantities for comparative purposes in accordance with Equation 8 set forth above so as to determine whether the reactance of the system is greater or less than a predetermined amount. Electric discharge valve 20, on the other hand, is provided with a control circuit 25 which is arranged to be energized at a predetermined instant during each cycle when a function of the instantaneous electrical quantities, which are being compared in control circuit 24 of electric discharge valve 19, corresponds to the predetermined function of peak values of certain electrical quantities and phase relationship therebetween as expressed in Equation 2 above. The predetermined instant during the cycle when the reactance of the circuit may be expressed by Equation 8 above occurs at the instant the system current is zero and, accordingly, electric discharge valve 20 should be rendered conductive once each cycle at one of the zero points of the system current.

For this purpose, I provide a peaking transformer 26 of a construction well understood by those skilled in the art having a primary winding 27 which also serves another purpose to be described hereafter, connected across the secondary winding of a current transformer 28 associated with the alternating-current system 11. The secondary winding 29 of peaking transformer 26 is connected in control circuit 25, which also includes a current-limiting resistor 30, a suitable bias battery 31, and control electrode 23 of electric discharge valve 20. The voltage across secondary winding 29 of peaking transformer 26 as is described in detail in an article entitled "Transformers with peaked waves" by O. Kiltie, appearing at page 802 of the November, 1932, issue of Electrical Engineering, is an alternating voltage including a series of narrow positive and negative peaks, the voltage between peaks being zero. The positive half cycle of this peaked alternating-current wave impressed upon control electrode 23 of electric discharge valve 20 renders this valve conductive and, if electric discharge valve 19 were simultaneously rendered conductive, current could flow in tripping circuit 17. Furthermore, as will be understood by those skilled in the art, since the peak voltage occurs substantially at the zero point of the current wave, electric discharge valve 20 will be rendered conductive once during each cycle at one of the zero points of the current flowing in alternating-current system 11.

In order that electric discharge valve 19 is rendered conductive when the reactance of the alternating-current system 11 falls to a predetermined value, control circuit 24 is energized by a pair of normally opposed voltages, one of which is proportional to the instantaneous system voltage while the other is proportional to the rate of change of current in accordance with the expression set forth by Equation 8 above. Accordingly, I provide a potential transformer 32 having a primary winding 33 connected across alternating-current system 11 so that a voltage proportional to the system voltage, except 180 degrees out of phase therewith in order to oppose the voltage proportional to the rate of change of current, appears across its secondary winding 34. A voltage proportional to the rate of change of system current is one that is advanced in phase ninety electrical degrees with respect to the system current. Such a voltage can be obtained across a reactance through which a current proportional to the system current flows. Instead of providing a separate reactance across which this quantity is obtained, I prefer to utilize as such a reactance primary winding 27 of peaking transformer 26 through which a current proportional to the system current flows. It will, of course, be understood by those skilled in the art that a separate reactance having a current proportional to the system current flowing therethrough could be used in place of primary winding 27 but this would necessitate additional apparatus. Reactance 27 is, therefore, connected in series with secondary winding 34 of potential transformer 32 in control circuit 24 of electric discharge valve 19 in such a manner that the respective voltages oppose each other, particularly in the neighborhood of the zero of the system current, so that the voltage across the reactance of primary winding 27 acts in an operating sense to tend to render electric discharge valve 19 conductive while the voltage across secondary winding 34 of potential transformer 32 acts in a restraining sense to maintain electric discharge valve 19 in a nonconductive condition.

A simple current-limiting resistor 35 is preferably connected in control circuit 24 in series with control electrode 23 of electric discharge valve 19 and, to obtain the desired control characteristic, it may be desirable to provide a suitable bias battery 36 connected in the grid-to-cathode circuit of valve 19 in series with current-limiting resistor 35. The critical grid control characteristic of electric discharge valve 19 should preferably be such that, whenever the resultant voltage across serially connected reactance 27 and secondary winding 34 of potential transformer 32 is zero or positive by virtue of a greater potential across reactance 27, electric discharge valve 19 is rendered conductive and will become conducting if electric discharge valve 20 is also simultaneously rendered conductive. It will, of course, be obvious to those skilled in the art that suitable means, such as a plurality of taps, not shown, may be provided on potential transformer 32 so that the electronic ohm unit 12 may be adjusted to have different reactance settings so as to enable one thereby to vary the predetermined reactance at which operation of the electronic ohm unit 12 will occur.

The operation of the protective arrangement embodying electronic ohm unit 12 illustrated in Fig. 1 will be well understood by those skilled in the art in view of the detailed description included above. Therefore, only a brief description with specific reference to the curves illustrated in Fig. 2 representing certain operating characteristics of the electronic device will be included here. The alternating voltage of system 11 is represented by the curve $e$ and the alternating current is represented by the curve $i$ lagging in phase by the angle $\theta$ which represents the power factor angle of the circuit. The voltage across the reactance 27, which also serves as the primary of peaking transformer 26, is represented by the curve $e_x$, which is proportional to $di/dt$ and which leads the current by ninety electrical degrees. The voltage $e_x$ is the operating voltage, which tends to render electric discharge valve 19 conductive, particularly in the neighborhood of the current zero when electric discharge valve 20 is rendered conductive. However, this voltage is opposed by a voltage obtained across secondary winding 34 of potential transformer 32 proportional to the system voltage, which must, therefore, be a voltage 180 degrees out of phase with the voltage $e$, shown in Fig. 2, in order to oppose the voltage $e_x$. As will be obvious to those skilled in the art, this 180 degree relationship may readily be obtained by properly relating the primary and secondary windings of potential transformer 32. The ratio of $e$ and $e_x$ is proportional to the reactance of the system as set forth in Equation 8 above.

It will be observed that, whenever $e_x$ is equal to or exceeds $e$ and a zero or resultant positive potential is impressed on the control circuit 24 of electric discharge valve 19, the latter is rendered conductive. However, electric discharge valve 19 cannot conduct current even though rendered conductive until electric discharge valve 20 is also rendered conductive and this occurs only when a positive potential peak obtained from peaking transformer 26 is impressed upon control circuit 25 of electric discharge valve 20. The alternate voltage peaks obtained across secondary winding 29 of peaking transformer 26 are represented by $e_{p1}$ and $-e_{p1}$ in Fig. 2, only the former of which can affect electric discharge valve 20. At the instant the positive voltage peak $e_{p1}$ renders electric discharge valve 20 conductive, it may be observed that the system voltage $e$ is equal to $E \sin \theta$ and $e_x$ is equal to I, and the ratio of these quantities at this instant is the relationship expressed by Equation 2 above.

If a fault should occur on alternating-current system 11 within the range for which electronic ohm unit 12 is set to operate, the reactance will be decreased and, hence, the voltage proportional to the rate of change of system current will exceed the voltage proportional to the system voltage and, at a predetermined instant during the cycle, namely, at the current zero, when electric discharge valve 20 is rendered conductive, the peak value I of the current will exceed the quantity $E \sin \theta$ so that a tripping current flows through tripping circuit 17 to cause opening of circuit breaker 14. Simultaneously with the opening of circuit breaker 14, "a" switch 18 is opened to interrupt the current flowing through electric discharge valves 19 and 20 so as to be in readiness for the next protecting operation.

With the arrangement described above, the maximum operating time would be one cycle. It will be understood by those skilled in the art that this time could be reduced to one half cycle by providing two additional electric discharge valves which are operated by the other half cycles of the alternating quantities so that a measurement of reactance occurs twice each cycle at the zero points of the system current.

In order that an ohm unit of the reactance type, when used in a protective system such as that described above, operates to protect a particular section of a system properly, it is often desirable to include a directional or starting element since otherwise the ohm unit might operate for either direction of power flow whether the fault were in the protected section or outside the protected section. In Fig. 3, I have illustrated schematically a protective system utilizing a distance relay of the reactance type which includes not only an electronic ohm unit but also an electronic starting unit or directional relay so as to have the desired directional characteristics. Although I have illustrated a starting unit or directional relay as embodied in a distance relay it will be understood by those skilled in the art that such directional relay may be used by itself to indicate or protect against power reversal and the like. The electronic ohm unit in Fig. 3 is substantially identical with the arrangement of Fig. 1 and, hence, the corresponding parts thereof are designated by the same reference numerals as in Fig. 1.

The operation of a starting unit or directional relay must be based on some function of circuit current and voltage and, in order to conform with the arrangements of the prior art, I prefer to base the operation of my starting unit or directional relay, generally indicated at 37 in Fig. 3, upon the function $$\frac{E}{I \cos \theta}$$

referred to above, the cosine function providing the desired directional characteristic. Since the electronic starting unit or directional relay 37 can respond only to instantaneous values of electric quantities, the above function, which includes peak values and phase relationship between these quantities, can be satisfied by a measurement of instantaneous values of electric quantities if, at some instant during the cycle, the instantaneous values are equal to this function of peak values and phase angle thereof. As was mentioned above, the quantity $$\frac{E}{I \cos \theta}$$

represents the ratio of the instantaneous voltage and current of the alternating current circuit when the voltage of the circuit is a maximum and, therefore, electronic starting unit or directional relay 37 must be provided with means for determining the ratio of the instantaneous values of voltage and current at a particular instant during the cycle, so as to prevent the operation of electronic ohm unit 12 unless the quantity $$\frac{E}{I \cos \theta}$$

decreases to a predetermined value, indicating an abnormal condition on system 11.

In order to prevent electronic ohm unit 12 from operating unless electronic starting unit 37 permits it to do so, the potential for the anode-cathode circuit of serially connected electric discharge valves 19 and 20 of electronic ohm unit 12 is obtained across a resistor 38 connected in the tripping circuit 17 of circuit breaker 14. Resistor 38 is also connected in series with an electric discharge valve 39 and a direct-current potential is applied across this series arrangement. This direct-current potential is also applied across a serially connected resistor 40 and an electric discharge valve 41, which are similar to resistor 38 and electric discharge valve 39, respectively and are connected in parallel therewith. Electric discharge valves 39 and 41 are preferably of the same type as electric discharge valves 19 and 20 and each comprise an anode 42, a cathode 43, and a control electrode 44.

Since, as mentioned above, the quantity $$\frac{E}{I \cos \theta}$$

is satisfied by the ratio of the instantaneous voltage and current at the instant the system voltage is a maximum, a control circuit is provided for electric discharge valves 39 and 41 alternately rendering them conductive at the maximum values E and −E of the sinusoidal alternating voltage e of system 11. This is accomplished by means of a peaking transformer 45 having a primary winding 46 which is energized from a secondary winding 34'' of potential transformer 32'. Potential transformer 32' of Fig. 3 is similar to the potential transformer characterized by the same unprimed reference numeral of Fig. 1 except that an additional secondary winding 34'' is provided for energizing the electronic starting unit or directional relay 37. The secondary winding 34', schematically illustrated as provided with taps to adjust the reactance setting of electronic ohm unit 12, is substantially identical to the secondary winding 34 of Fig. 1 which may also be a tapped winding.

Peaking transformer 45 may be similar to peaking transformer 26 described above in connection with Fig. 1 so that an alternating potential of peaked wave form is obtained across secondary winding 47 thereof. The end terminals of secondary winding 47 of peaking transformer 45 are illustrated as being connected respectively to the control electrodes 44 of electric discharge valves 39 and 41 through suitable current-limiting resistors 48. In order to complete the grid-to-cathode circuits of electric discharge valves 39 and 41, the midpoint 49 of secondary winding 47 of peaking transformer 45 is connected to the cathodes 43 of these electric discharge valves through a suitable bias battery 50'. It will be observed that the current flowing through primary winding 46 of peaking transformer 45 lags the potential across secondary winding 34'' of transformer 32' and, hence, the system voltage by substantially ninety electrical degrees. As is well understood by those skilled in the art, the peaked voltage across the secondary winding of a peaking transformer occurs substantially at the zero point of the current flowing through the primary winding, and it follows, therefore, that the peaked voltage output of peaking transformer 45 occurs substantially at the instant in the cycle when the system voltage is a maximum, that is, when e is equal to E or −E. Except for the fact that an electric discharge valve 50, the purpose of which is to be described in detail hereinafter, is connected in series with electric discharge valve 39 and resistor 38, electric discharge valves 39 and 41 would be connected in a sort of inverter circuit, alternately conducting current as the voltage of peaked wave form impressed on their respective grid-to-cathode circuits alternately renders them conductive. A suitable commutating capacitor 51 is provided in order to commutate the current from one electric discharge valve, such as 39, to the other electric discharge valve 41 and vice versa. Whenever electric discharge valve 39 is conducting current, a potential drop will appear across resistor 38 to operate electronic ohm unit 12 and cause tripping of circuit breaker 14 in the event that electric discharge valves 19 and 20 are conductive at this time. It will be observed that, during the other half cycle of the system voltage when electric discahrge valve 41 is conducting current, no potential drop will appear across resistor 38 and, hence, during this half cycle, the operation of electronic ohm unit 12 and tripping of circuit breaker 14 is blocked.

In order to control the operation of electronic starting unit or directional relay 37 so that operation thereof will occur whenever the ratio of the instantaneous voltage and current of system 11, which is equal to $$\frac{E}{I \cos \theta}$$

at the particular instants during the cycle when electric discharge valves 39 or 41 are rendered conductive, falls below a predetermined value, electric discharge valve 50, which is preferably similar to electric discharge valves 39 and 41 having an anode 52, a cathode 53, and a control electrode or grid 54, is provided with a suitable control circuit generally indicated at 55. Control circuit 55 is energized by a plurality of voltages which are obtained across secondary winding 34' of potential transformer 32' and secondary winding 56 of transformer 57 having its primary winding 58 connected across a suitable resistor 59 which, in turn, is connected in series with current transformer 28 associated with alternating-current system 11. Resistor 59 is provided so that the circuit through reactance 27 is never adversely affected as might be the case if only transformer 57 were provided particularly during the periods when electric discharge valve 50 is nonconductive. The potential across secondary winding 34" is, of course, proportional to the system voltage while the potential across secondary winding 56 of transformer 57 is proportional to the system current so that these potentials as applied to control circuit 55 tend to render electric discharge valve 50 conductive whenever the ratio of the instantaneous voltage to the instantaneous current decreases below a predetermined value and, since electric discharge valve 50 cannot become conducting unless electric discharge valve 39 is conductive, which only becomes so substantially at the maximum point of the system voltage, electric discharge valve 50 can become conducting only when $$\frac{E}{I \cos \theta}$$

is less than a predetermined amount. A suitable current-limiting resistor 60 is preferably provided for control circuit 55 and, if desired, a suitable bias battery 61 may be connected in the grid-to-cathode circuit thereof. Also, in order to adjust the predetermined value of $$\frac{E}{I \cos \theta}$$

at which the electronic starting unit 37 operates, secondary winding 34" of potential transformer 32' is provided with a plurality of adjustable taps.

The operation of the electronic distance relay illustrated in Fig. 3 will be considered with reference to the wave forms of Fig. 4. The wave forms similar to those illustrated in Fig. 2 are characterized by the same nomenclature. However, in addition thereto, the current $i_{pv}$ which represents the current flowing through the primary winding 46 of peaking transformer 45 is included. The alternating potential of peaked wave form obtained across secondary winding 47 of peaking transformer 45 is illustrated by the alternate positive and negative peaks $e_{pv}$ and $-e_{pv}$ which occur at the zero points of the current $i_{pv}$ and, hence, at the maximum points E and $-E$ of the system voltage $e$ at which instant the system current $i$ is equal to $I \cos \theta$.

It will be observed that, whenever electric discharge valve 41 is rendered conductive by the peak voltage $-e_{pv}$, electric discharge valve 50 cannot conduct current and, hence, operation of electronic starting unit or directional relay 37 can only occur during the intervals marked "operating range" in Fig. 4. If, during this interval when electric discharge valve 39 is rendered conductive, the ratio of instantaneous voltage and current of system 11 should be such that, at $e=E$, a potential is applied to the control electrode 54 of electric discharge valve 50 rendering it conductive, so that operation of starting unit 37 occurs and a potential appears across resistor 38. Such operation can only occur when the quantity $$\frac{E}{I \cos \theta}$$

falls below a predetermined value, indicating that the power flow in system 11 is in a predetermined direction. If, during the operating range of Fig. 4, when a potential appears across resistor 38, and the reactance measured by electronic ohm unit 12, as described above, falls below a predetermined value, a fault is indicated and a tripping current will flow through tripping circuit 17 to open circuit breaker 14 and isolate system 11.

It will be observed that, in the arrangement disclosed in Fig. 3 above, the electronic starting unit and the electronic ohm unit perform their respective measuring operations at different instants during the cycle, having no fixed time relationship. However, by virtue of the directional characteristic, the operation of the starting unit 37 is maintained for 180 electrical degrees to permit the operation of the ohm unit during this interval if the reactance measured thereby indicates a fault on the system being protected.

As was mentioned above, it is obvious that the above-described directional relay may be used as a reverse power relay and for other purposes outside the distance-relaying field, its application in a distance relay having been described by way of example only. Furthermore, it will be observed that, when used as a power directional relay, it possesses inherent memory action since, once the electric discharge valves have been rendered conductive, the relay will continue to show the direction in which power last flowed even though the voltage of the circuit should be reduced to substantially zero.

It will be understood by those skilled in the art that, while I have illustrated and described certain particular embodiments of my invention, modifications thereof will occur to those skilled in the art. I desire it to be understood, therefore, that my invention is not limited to the particular arrangements disclosed and I intend in the appended claims to cover all modifications and changes which fall within the true spirit and scope of my invention.

What I claim as new and desire to secure by Letters Patent of the United States, is:

1. In combination with an alternating-current electric circuit, circuit-interrupting means for controlling said circuit, and fault-responsive electronic means comprising a pair of serially connected electric discharge valves for controlling said circuit-interrupting means in response to the balance between the instantaneous values of a plurality of electrical quantities or functions thereof of said circuit at a predetermined instant during the alternating-current cycle.

2. In combination with an alternating-current electric circuit, circuit-interrupting means for controlling said circuit, and fault-responsive electronic means comprising a pair of serially connected electric discharge valves for controlling said circuit-interrupting means, said electronic means being arranged to respond to a predetermined function of the instantaneous values of certain electrical quantities derived from said alternating-current circuit at an instant when a predetermined relationship between the derived instantaneous values corresponds to a predetermined function of certain electrical quantities of the circuit and the phase angle between them.

3. In combination with an alternating-current electric circuit, circuit-interrupting means for controlling said circuit, means for deriving from said circuit two voltages respectively dependent upon the rate of change of circuit current and upon the circuit voltage, electronic means comprising a pair of serially connected electric discharge valves for controlling said circuit-interrupting means in accordance with the balance between said two voltages at an instant during the alternating-current cycle when the ratio of the instantaneous values of said two voltages corresponds to a predetermined function of amplitude and phase relationship of certain electrical quantities of said alternating-current circuit.

4. In combination with an alternating-current electric circuit, circuit-interrupting means for controlling said circuit, means for deriving from said circuit two voltages respectively dependent upon the circuit voltage and the circuit current, electronic means for controlling said circuit-interrupting means only when the power flow of said circuit is in a predetermined direction, said electronic means being arranged to compare the instantaneous values of said two voltages at the instant during the alternating-current cycle when the circuit voltage is a maximum.

5. In combination with an alternating-current electric circuit, circuit-interrupting means for controlling said circuit, means for deriving from said circuit two voltages respectively dependent upon the instantaneous circuit voltage and the instantaneous circuit current, electronic means for controlling said circuit-interrupting means in response to the ratio of said two voltages only at an instant during the alternating-current cycle when said ratio represents a function of the amplitude and phase relationship of said circuit voltage and current.

6. In combination with an alternating-current electric circuit, circuit-interrupting means for controlling said circuit, means for deriving from said circuit two voltages respectively dependent upon the instantaneous circuit voltage and the instantaneous circuit current, electronic means for controlling said circuit-interrupting means in response to the ratio of said two voltages at an instant during the alternating-current cycle when said ratio is equal to the function $$\frac{E}{I \cos \theta}$$

7. In an electroresponsive device of the electronic type comprising a pair of serially connected electric discharge valves, means for controlling the conductivity of one of said electric discharge valves in response to the instantaneous values of a plurality of alternating electrical quantities, and means for rendering said second electric discharge valve conductive at a predetermined instant during the cycle of said alternating electrical quantities when a predetermined function of said instantaneous values corresponds to a predetermined function of amplitude and phase relationship of said quantities.

8. In an electroresponsive device of the electronic type comprising a pair of serially connected electric discharge valves, means for controlling the conductivity of one of said electric discharge valves in response to a function of the instantaneous values of a plurality of alternating electrical quantities, and means for rendering said second electric discharge valve conductive at the zero value of one of said quantities when the function of said instantaneous values corresponds to a predetermined function of amplitude and phase relationship of said quantities.

9. In an electroresponsive device of the electronic type comprising a plurality of electric discharge valves, means for controlling the conductivity of one of said electric discharge valves in response to the instantaneous values of an alternating current and an alternating voltage, and means for rendering another of said electric discharge valves conductive when said voltage is a maximum so that the ratio of these instantaneous values of current and voltage corresponds to a predetermined function of peak values and phase relationship of said current and voltage.

10. In combination with an alternating-current electric circuit and circuit-interrupting means for controlling said circuit, means for deriving from said circuit a plurality of voltages respectively dependent upon a plurality of different electrical quantities of said circuit, electroresponsive means for controlling said circuit-interrupting means in accordance with said plurality of voltages, and means comprising a peaking transformer for permitting said voltages to become effectively operative to control said electroresponsive means only at a predetermined instant during the cycle of the alternating current of said circuit.

11. In combination with an alternating-current electric circuit and circuit-interrupting means for controlling said circuit, means for deriving from said circuit two voltages respectively dependent upon the rate of change of the circuit current and on the circuit voltage, electroresponsive means for controlling said circuit-interrupting means in accordance with the relative values of said two voltages, and means comprising a peaking transformer for permitting said voltages to become effectively operative to control said electroresponsive means only approximately at the moment the circuit current is passing through its zero value.

12. In combination with an alternating-current electric circuit and circuit-interrupting means for controlling said circuit, means for deriving from said circuit two voltages respectively dependent upon the circuit current and the circuit voltage, electroresponsive means for controlling said circuit-interrupting means in accordance with the relative values of said two voltages, and means comprising a peaking transformer for permitting said voltages to become effectively operative to control said electroresponsive means only approximately at the moment the circuit voltage is a maximum.

13. In combination with an alternating current electric circuit, means for interrupting said circuit, and fault-responsive protective means for effecting the opening of said circuit-interrupting means on the occurrence of a fault in accordance with the distance to the fault comprising an ohm unit operable in response to the instantaneous values of a plurality of electrical quantities of said circuit at a predetermined instant during the alternating-current cycle, and a directional unit operable in response to the instantaneous values of a plurality of electrical quantities at a different predetermined instant during the alternating-current cycle.

14. In combination with an alternating-current electric circuit, means for interrupting said circuit, fault-responsive protective means for effecting the opening of said circuit-interrupting means upon the occurrence of a fault in accordance with the distance to the fault comprising an electronic relay including a directional element and an ohm unit, each comprising a pair of serially connected electric discharge valves, and means for opening said circuit-interrupting means when the electric discharge valves of said ohm unit are conducting current.

15. In combination with an alternating-current electric circuit, means for interrupting said circuit, and fault-responsive protective apparatus for effecting the opening of said circuit-interrupting means upon the occurrence of a fault in accordance with the distance to the fault comprising a reactance relay including a directional element and a reactance-measuring element, said directional element comprising a pair of electric discharge valves, one of which is responsive to a function of the instantaneous values of a plurality of alternating electrical quantities of said circuit while said second electric discharge valve permits the operation of said one valve at a predetermined instant during the alternating-current cycle when said function of the instantaneous values corresponds to a predetermined function of peak values and phase relationship of said quantities.

16. In combination with an alternating-current electric circuit, means for interrupting said circuit fault-responsive protective means for effecting the opening of said circuit-interrupting means upon the occurrence of a fault in accordance with the distance to the fault comprising a reactance relay including a directional unit operable in response to the instantaneous values of a plurality of electrical quantities of said circuit at a predetermined instant during the alternating-current cycle, and an ohm unit operable in response to the instantaneous values of a plurality of electrical quantities at a different predetermined instant during the alternating-current cycle, and means for varying the distance setting of said reactance relay.

17. In a distance relay of the reactance type comprising an electronic directional element and an electronic ohm unit, the combination of a pair of serially connected electric discharge valves, means for controlling the conductivity of one of said electric discharge valves in response to a function of the instantaneous values of a plurality of alternating electrical quantities, and means including a peaking transformer for rendering said second electric discharge valve conductive at a predetermined instant during the cycle of said alternating electrical quantities when said function of the instantaneous values corresponds to a predetermined function of amplitudes and phase relationship of said quantities.

18. In combination with an alternating-current electric circuit, means for interrupting said circuit, fault-responsive protective means for effecting the opening of said circuit-interrupting means upon the occurrence of a fault in accordance with the distance to the fault comprising an ohm unit including a peaking transformer and a plurality of electric discharge valves operable in response to the instantaneous values of a plurality of electrical quantities of said circuit at a predetermined instant during the alternating-current cycle and a directional unit including a plurality of electric discharge valves and a peaking transformer, one of the electric discharge valves of said directional unit being conductive during alternate half cycles of said alternating-current electric circuit to block operation of said ohm unit during said alternate half cycles.

19. In combination with an alternating-current electric circuit, means for interrupting said circuit, a reactance relay for controlling said interrupting means upon the occurrence of a fault within a predetermined distance from said relay comprising a directional element including a peaking transformer and a plurality of serially connected electric discharge valves, said directional element being operable in response to a fault in a predetermined direction from said relay, and an ohm unit including a peaking transformer and a plurality of serially connected electric discharge valves whose operation depends upon the simultaneous or prior operation of said directional element and a predetermined decrease in reactance of said alternating-current circuit.

20. In combination with an alternating-current electric circuit, means for interrupting said circuit, a reactance relay for controlling said interrupting means upon the occurrence of a fault within a predetermined distance from said relay comprising a directional element including a peaking transformer and a plurality of serially connected electric discharge valves, said directional element being operable in response to a fault in a predetermined direction from said relay, and an ohm unit including a peaking transformer and a plurality of serially connected electric discharge valves whose operation depends upon the simultaneous or prior operation of said directional element and a predetermined decrease in reactance of said alternating-current circuit, and means for varying the distance setting of said reactance relay.

21. In combination with an alternating-current electric circuit, means for interrupting said circuit, and fault-responsive protective means for effecting the opening of said circuit-interrupting means upon the occurrence of a fault in accordance with the distance to the fault from said fault-responsive protective means comprising an ohm unit operable in response to the instantaneous values of a plurality of electrical quantities of said circuit at the instant during the alternating-current cycle when the circuit current is zero, and a directional unit operable in response to a function of the instantaneous values of a plurality of electrical quantities at the instant during the alternating-current cycle when the circuit voltage is a maximum.

22. In combination with an alternating-current electric circuit, circuit-interrupting means for controlling said circuit, means for deriving from said circuit two voltages respectively dependent upon the instantaneous circuit voltage and the instantaneous circuit current, and electronic means for controlling said circuit-interrupting means in response to a predetermined function of said two voltages only at an instant during the alternating-current cycle when said function corresponds to a predetermined relationship between the amplitude and phase relationship of said circuit voltage and current.

23. In an electroresponsive device of the electronic type comprising a pair of serially connected electric discharge valves, means for controlling the conductivity of one of said electric discharge valves in response to a function of the instantaneous values of a plurality of alternating electrical quantities, and means for rendering said second electric discharge valve conductive at a predetermined value of one of said quantities when the function of said instantaneous values corresponds to a predetermined function of amplitude and phase relationship of said quantities.

24. In combination with an alternating-current electric circuit, a device to be operated, means for deriving from said circuit two voltages respectively dependent upon the instantaneous circuit voltage and the instantaneous circuit current, and electronic means for controlling said device in response to a predetermined function of said two voltages at an instant during the alternating-current cycle only when said function corresponds to a predetermined relationship between the amplitude and phase relationship of said circuit voltage and current.

25. In combination with an alternating-current electric circuit, switching means for controlling said circuit, an electroresponsive device of the electronic type comprising a pair of serially connected electric discharge valves, means for controlling the conductivity of one of said electric discharge valves in response to functions of a plurality of alternating quantities, at least one of said quantities being derived from said alternating-current circuit, and an energization circuit for the other of said electric discharge valves including a peaking transformer, said switching means being operated when said electric discharge valves are simultaneously rendered conductive.

26. In combination with an alternating-current electric circuit, switching means for controlling said circuit, an electroresponsive device of the electronic type comprising a pair of serially connected electric discharge valves, means for controlling the conductivity of one of said electric discharge valves in response to functions of a plurality of alternating quantities, at least one of said quantities being derived from said alternating-current circuit, and means for energizing the other of said electric discharge valves in response to an alternating quantity derived from said circuit only at a predetermined instant during the cycle of said last-mentioned alternating quantity, said switching means being operated when said electric discharge valves are simultaneously rendered conductive.

MAURICE E. BIVENS.